United States Patent [19]

Bernard et al.

[11] Patent Number: 5,643,400

[45] Date of Patent: Jul. 1, 1997

[54] METHOD AND APPARATUS FOR PRODUCING SEAMLESS RETROREFLECTIVE SHEETING

[75] Inventors: Gus Bernard, West Hartford; Robert B. Nilsen, Weatoque; Michael J. Hanrahan, Danbury, all of Conn.

[73] Assignee: Reflexite Corporation, Avon, Conn.

[21] Appl. No.: 678,502

[22] Filed: Jul. 9, 1996

Related U.S. Application Data

[62] Division of Ser. No. 444,759, May 19, 1995, Pat. No. 5,558,740.

[51] Int. Cl.$^6$ .......................... B29C 43/26; B29C 43/28
[52] U.S. Cl. .......................... 156/500; 156/553; 425/92; 425/101; 425/115
[58] Field of Search .......................... 156/500, 553, 156/390, 542, 231, 243, 245, 324; 425/92, 101, 115, 174.4, 384, 385, 808; 359/529–533, 900

[56] References Cited

U.S. PATENT DOCUMENTS 2,456,113 12/1948 Dorner .
3,689,346 9/1972 Rowland .......................... 156/245
3,810,804 5/1974 Rowland .......................... 156/245
3,935,359 1/1976 Rowland .......................... 156/231
4,244,683 1/1981 Rowland .......................... 425/385
4,332,847 6/1982 Rowland .......................... 428/156
4,601,861 7/1986 Pricone .......................... 425/385

FOREIGN PATENT DOCUMENTS 30 02 881 A1  10/1981  Denmark .

OTHER PUBLICATIONS

"Patent Abstracts of Japan," vol. 005, No. 135 (M–085), 27 Aug. 1981 and JP,A,56 070929 (Kitai Seisakusho:KK), 13 Jun. 1981. (See abstract in International Search Report.)

Primary Examiner—Daniel Stemmer
Attorney, Agent, or Firm—Hamilton, Brook, Smith & Reynolds, P.C.

[57] ABSTRACT

A method and apparatus for forming "seamless" retroreflective sheeting is described. At least two mold surfaces are used, each having alternate areas of arrays of prism recesses and spaces. In a first step, prisms are formed in one of the mold surfaces and applied to a base film or web. Next, prisms are formed on the second mold surface and applied to the spaced areas left in the first step.

5 Claims, 5 Drawing Sheets

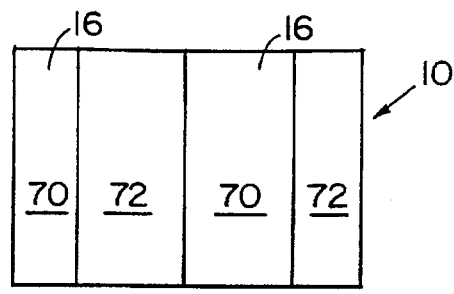
FIG. 2
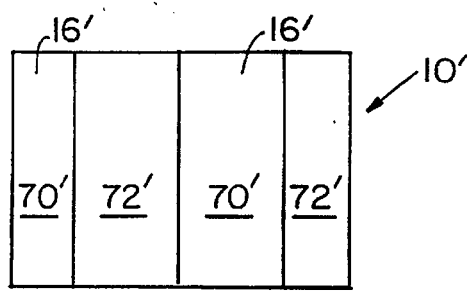
FIG. 3
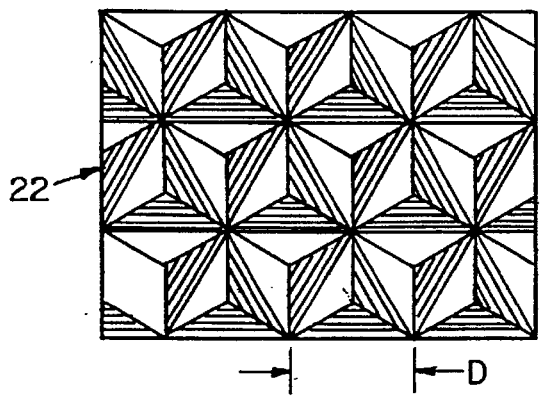
FIG. 4
FIG. 6
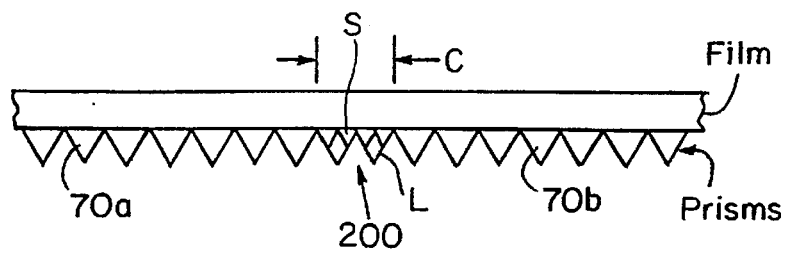
FIG. 7A
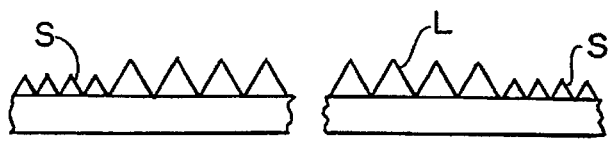
FIG. 7B
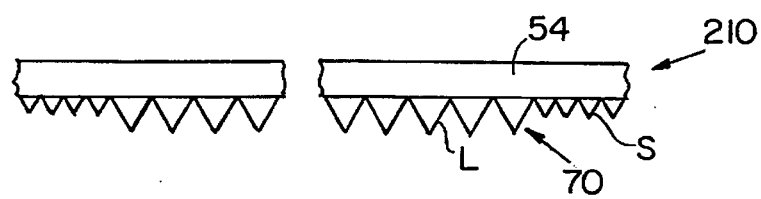
FIG. 7C
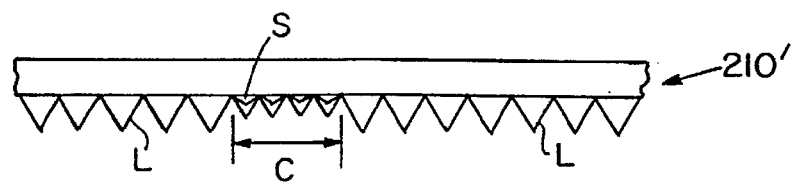

METHOD AND APPARATUS FOR PRODUCING SEAMLESS RETROREFLECTIVE SHEETING

RELATED APPLICATION

This application is a division of application Ser. No. 08/444,759 filed May 19, 1995, now U.S. Pat. No. 5,558,740, which is incorporated herein by reference in its entirety.

BACKGROUND OF THE INVENTION

A demand exists for retroreflective materials i.e., materials capable of reflecting the predominant portion of light rays impinging thereon in a substantially parallel path toward the source of the light. A particularly efficient type of retroreflective element employs molded members of cube-corner formations for retroreflective structures.

Cube-corner reflectors molded from glass and more recently from acrylic resins have commonly been employed as safety devices on bicycles, automobiles and other vehicles.

Rowland in U.S. Pat. No. 3,689,346 describes a process in which retroreflective sheeting is produced on a continuous basis by applying transparent sheet material over a hardenable molding material previously deposited upon a moving mold surface, after which the molding material is solidified and bonded to the sheet material to produce a composite structure. The mold surface has an array of minute, contiguous cube-corner recesses therein, so that the sheeting correspondingly has a multiplicity of closely spaced cube-corner formations spaced about and projecting form a smooth surface of the sheet material, which provides the body portion thereof.

Currently, masters for the molds are flycut using machinery which must be accurate to approximately one millionth of an inch over the entire size of the master. Machines of this type can be used to make masters which are as large as 12"×12" but not much larger. The larger the size of the machine, the greater the cost. A machine that can flycut a 12"×12" master costs approximately $500,000 and a machine that will flycut a 18"×18" master costs approximately $1,000,000. The cost increases exponentially with the machine size because of the accuracies required. Typically, electroformed replicas of the master are made and the replicas are assembled into larger molds using two steps.

The first step is to finish the edges of the 12"×12" pieces using a very precise edge finishing process, such as lapping and polishing or fly cutting. Three 12"×12" pieces are then assembled into a roughly 12"×36" mold. The 12" long seams which are made are less than 0.001" in width and are acceptable for most applications and also the replica of the assembly is one continuous electroform. Strength at the seams is not a problem because the piece is all one electroformed piece of metal. The next step is to assemble the 12"×36" molds to one another to form a belt. This step requires edge finishing equipment which must be extremely precise over the entire 36" width of the mold. It is possible to assemble larger molds at this point, for example, a 24"×36" mold or a 36"×36" mold, but the equipment required to edge finish and also the equipment needed to electroform larger parts, becomes more sophisticated and much more expensive.

Therefore it is typically preferred to weld the 12"×36" molds together and, to achieve the strength required for the finished belt, the assembly is welded on both the back and the front of the seams. The light weld that is present on the front of the seams is approximately 0.015" to 025" wide, will not retroreflect and creates a seam that is more visible than desired in daylight and in retroreflected light. The textured surface of the seam causes scattering of the reflected light and makes the seam very visible, especially if the material made from the molds is metallized.

SUMMARY OF THE INVENTION

Seamless retroreflective sheeting is formed in accordance with the present invention. By "seamless" is meant, retroreflective sheeting having no seams in the sheeting of a size greater than about 0.010 inches over a substantially continuous web of material, as long as several thousand feet, so that the "seams" are substantially invisible to the unassisted human eye from a distance of about 10 feet.

The foregoing is accomplished by providing at least two mold surfaces. Preferably, the mold surfaces are provided on rotatable drums. Each mold surface contains alternate areas of arrays of prismatic recesses and blank areas of spaces or voids. Preferably the areas are either equal to one another, or the areas of prismatic recesses are slightly larger than the areas of spaces. Hardenable, prism forming liquid material, is applied to a first one of the mold surfaces to fill the areas of prism recesses and a base film is applied to the liquid filled recessed areas. The material is heated, or otherwise treated, to solidify the material thereby forming alternate areas of arrays of prisms bonded to the film and blank areas consisting of spaces or voids.

The film thus formed is transported to the second mold surface where the areas of arrays of prismatic recesses in the second mold surface are filled with the hardenable prism forming liquid materials and applied to the film at the blank areas of the film where the spaces remain. The material is then solidified leaving a continuous "seamless" sheet or web of retroreflective prisms formed on the film.

BRIEF DESCRIPTION OF THE DRAWINGS

FIG. 2 is a schematic plan view of the drum 10 of station A of FIG. 1 at a given instant in time.

FIG. 3 is a schematic view of the drum 10' of station B of FIG. 1 at a later instant in time.

FIG. 4 is an enlarged plan view of a portion of the mold plate 16 of FIG. 1.

FIG. 6 is a fragmentary side view of reflective sheeting produced in accordance with an alternate embodiment of the present method.

FIGS. 7A–C are a series of fragmentary side views of alternate steps in the process of making retroreflective sheeting in accordance with the invention.

DETAILED DESCRIPTION OF THE ILLUSTRATED EMBODIMENTS

Figure 1:
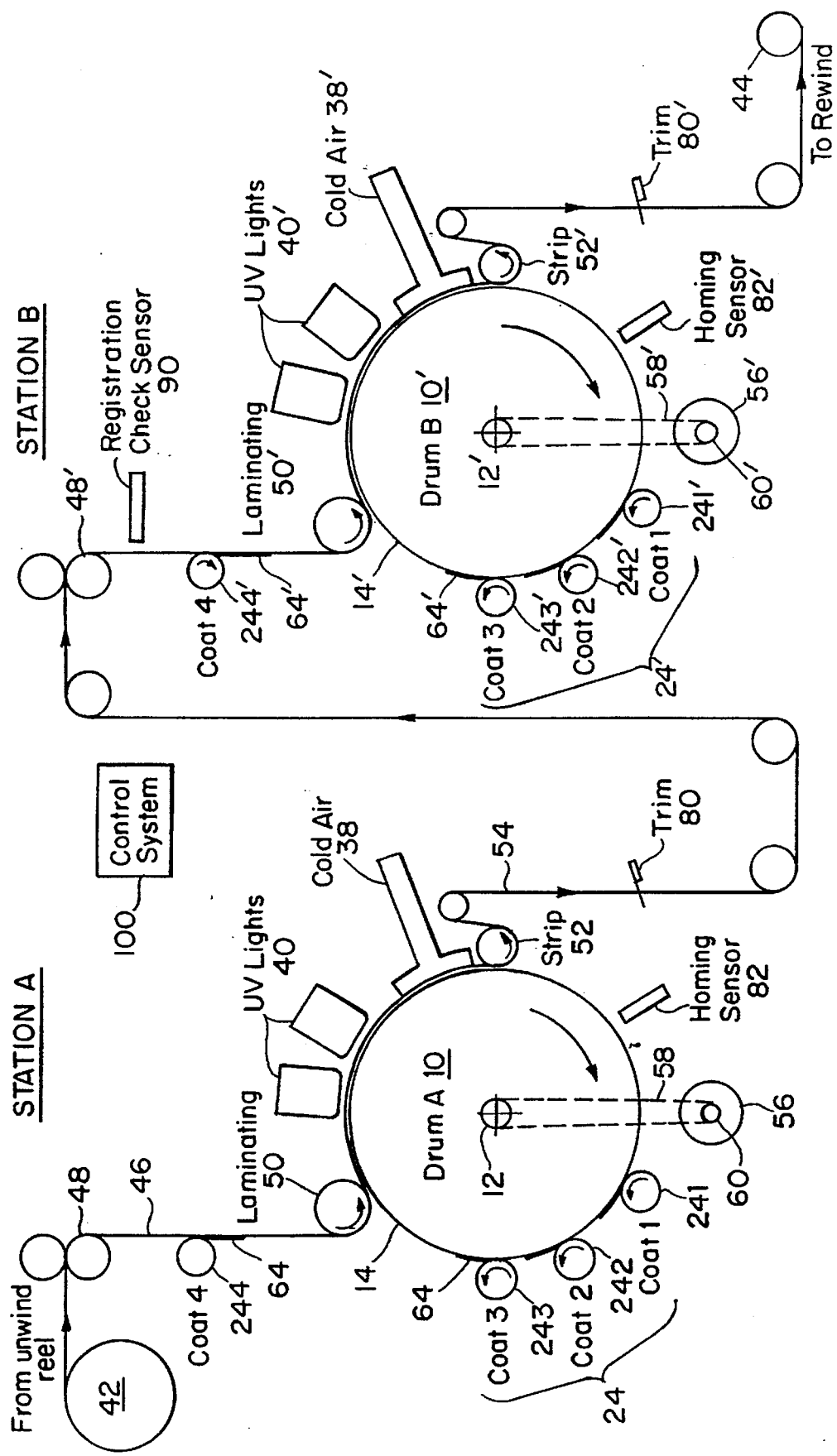
FIG. 1 is a schematic illustrational view of apparatus embodying the present invention.

Turning now to FIGS. 1–3 of the appended drawings an apparatus for producing seamless reflective sheeting on a continuous basis will now be described in detail.

The apparatus includes a pair of molding drums of about 48 inches diameter 10,10' mounted upon shafts 12,12' for rotation in the direction indicated by the arrows (i.e. clockwise). Drum A is designated the master axis and it produces the reference signal for the machine synchronization. The circumferential portion of the drums 10,10', generally designated by the numerals 14,14', consist of a multiplicity of 10 inch by 30 inch nominally sized metallic plates 16,16' bonded to the circumferential base portions. Alternate 10 inch plates 70,70' are formed with a multiplicity of identical contiguously arranged cube-corner recesses or prismatic indentations 22,22' (a portion of which is shown greatly enlarged in FIG. 4).

Note that the dimensions of the mold recesses and hence the resultant prisms forming the array are extremely small. The side edge dimension D of each prism is a maximum of 0.025 inches and preferably not more than 0.010 inches with an optimum size in the order of 0.0005 to 0.008 inches. The plates 16, 16' are provided in alternate areas 70, 70' about the circumference of the drums 10, 10' to provide a molding surface that has a substantially continuous array of cube-corner recesses 22 therein with blank areas 72, 72' therebetween which are devoid of recesses.

A coating assembly, generally designated by the numerals 24,24' is mounted adjacent a segment of a respective drum 10,10'. This assembly consists of three coating stations, 241, 242, 243 and 241', 242', 243', each one of which will apply a metered amount of the prism forming liquid i.e. resin into the prism recesses. Each station controls the appropriate controls and rollers to precisely deposit the liquid without overfilling the recesses. The three stations are used to enhance the removal of air from the bottoms of the prismatic plates. A fourth coating station 244,244', identical to the first three, coats the web 46 before it is laminated to the drums 10,10'.

A bank of ultraviolet lights 40,40' is mounted (also by means not shown) adjacent the drums 10'10' for curing of the materials deposited thereon at a point about the axis between the laminating roller 50,50' and the cold air plenum 38,38'.

Rotatably mounted film feed and take-up reels 42 and 44, respectively, are positioned on opposite sides of the assembly. In passing from the feed reel 42 to the drum 10, the film 46 passes through a tension nip (not shown) and thereafter about a relatively resilient pressure roll 50, also referred to as the laminating roll, the latter being mounted with its surface closely adjacent to that of the drum 10 and with their respective axes of rotation parallel. A stripping roll 52 is similarly mounted on the opposite side of the drum 10, and the partially formed reflective sheeting generally designated by the numeral 54, passes about it in its travel to the next tension nip 48'. Sheeting 54 travels to the second drum 10' where it proceeds through a similar set of devices (designated by the numeral 54, passes about it in its travel to the next tension nip 48'. Sheeting 54 travels to the second drum 10' where it proceeds through a similar set of devices (designated by a prime suffix) corresponding to those heretofore described in connection with drum 10. An edge trimming station 80,80' is employed after each station to remove any poorly replicated edges from the web 54. The motors 56,56' drive the drums in a conventional manner, under computer control from control system 100 such as the chains 58,58' provided about the shafts 12,12' and shaft 60,60' thereof.

Operation of the apparatus will be apparent from the foregoing and the following description. As the drum 10 in section A continuously rotates, a hardenable molding material 64,64' in fluid form is deposited thereupon on the prismatic recesses. These coating stations 24,24' are held in register through the homing sensors 82,82' mounted adjacent the circumference of the drum 10,10' in a fixed position. The homing sensors provide an electrical feedback signal to the control system 100 to adjust the position of the coating stations 24,24'. Film 46 is continuously withdrawn from the feed reel 42 and applied first against the drum 10 by the laminating roll 50, which cooperates with the drum 10 to provide a nip at which the hardenable material 64 is uniformly distributed over the surface of the prism array recess areas 70 of the molds 16 on drum 10, and at which intimate contact is effected between the material 64 and the film 46.

The freshly applied material 64 and the film 46, travel together past the bank of ultraviolet lamps 40, where hardening of the material 64 and bonding thereof to the film 42 are concurrently effected. Thereafter, the cold air plenum 30 helps cool the material so that the partially completed reflective sheeting 54 can be readily stripped from the drum 10 about the roll 52.

Figure 5:
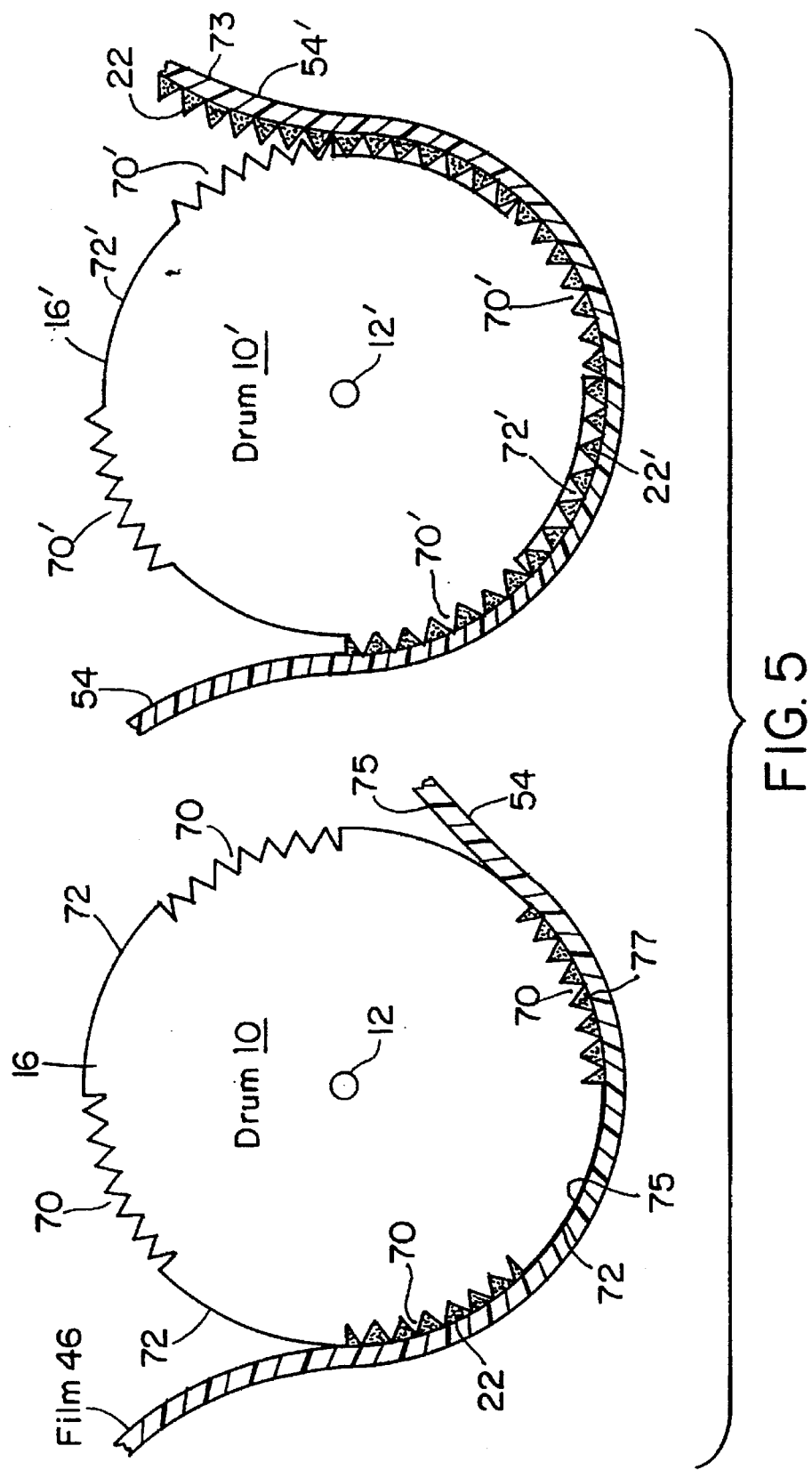
FIG. 5 is a schematic fragmentary view in partial section to an enlarged scale of the apparatus of FIG. 1.

As shown in the enlarged fragmented simplified schematic side view of FIG. 5, at this stage of the process, arrays of cube-corner prisms 22 have been formed on the film 46 only adjacent areas 70 of the mold surface 16 while the remaining portions of the film adjacent areas 72 are left void. In the next step of the process, the areas on the film left with voids are filled in with an array of prisms 22' to form a substantially seamless continuous length web 73 of cube-corner formations 22 on the resultant film 54'.

To do this, the plates 16' on drum 10' are arranged on the drum with respect to the film 54 in such a manner that the prism array recess area 70' coincides with the voids 75 left on the film 54' and the blank area 72' on the mold surface coincides with the areas 77 on the film 54 where the array of prisms 22 were previously formed on drum 10.

Referring back to FIG. 1, the partially completed film 54 is fed through a tension nip 48' and past a registration check optical sensor 90. This sensor feeds an electrical signal related to the position of the incoming web 54 to the computer system 100 and positional corrections are processed to ensure that the partially completed reflective film 54 is in proper alignment to contact the drum 10' through the laminating roll 50', where it encounters the freshly applied hardenable material 64' on the prism array recess areas 70' of the molds 16' on drive 12'; but only at the spaces 72 left on the film in the previous operation.

The timing of this operation must be done with precision, such that the two drives operate in synchronization to eliminate any seam forming when the second operation is performed. Preferably, the two stations A and B are synchronized by a Berkeley Process Control System, Series 64, manufactured and sold by Berkeley Process Control, Inc. (labelled control system 100 in FIG. 1).

The first curing station A is used as the master axis and the second station B is controlled to register the second station in line and to wind up the material. Precise machine control over all the drive mechanisms coupled with optical encoder feedback and a dedicated input utilizing flying position measurement is essential to eliminate the seam.

Figure 9:
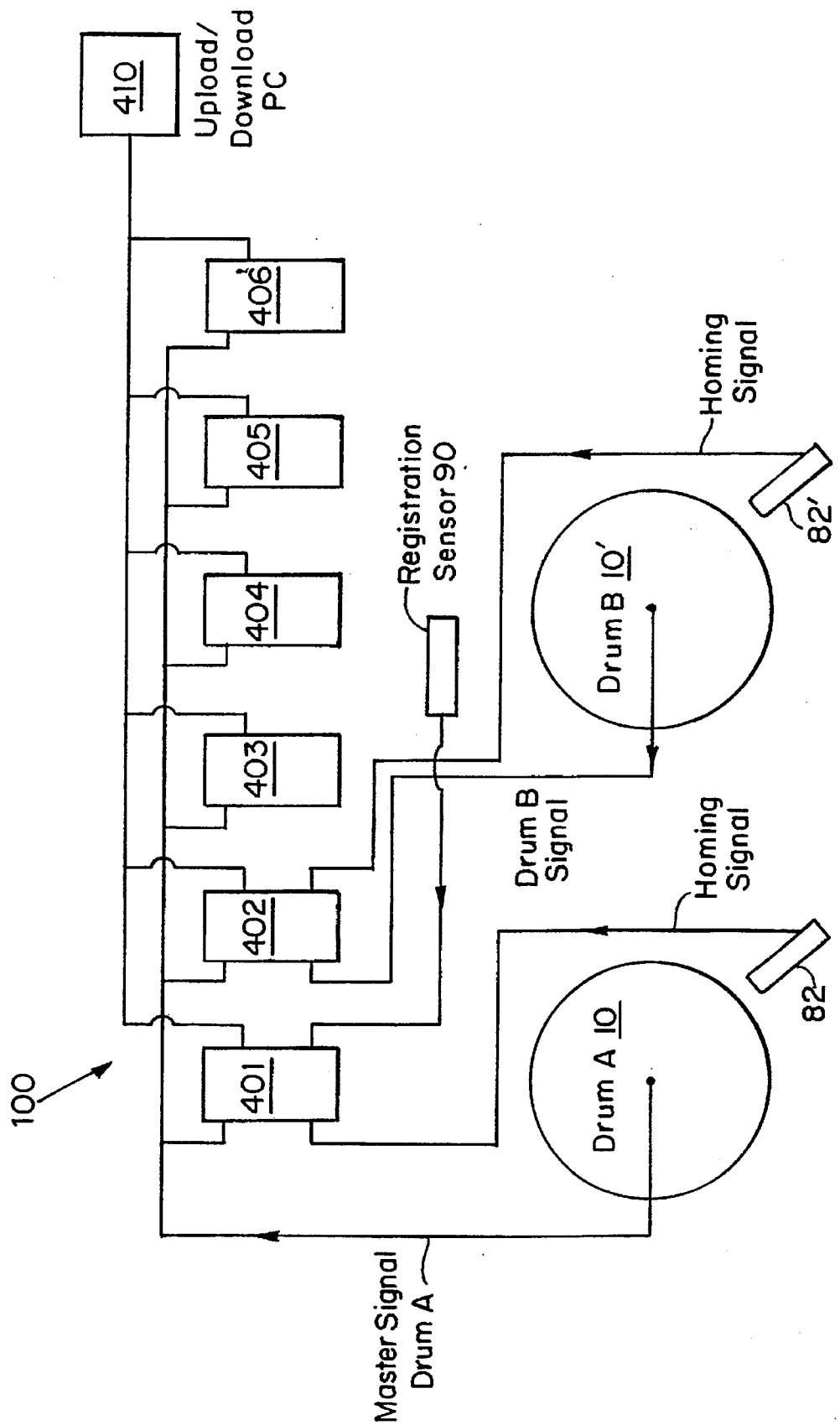
FIG. 9 is a block diagram of a control system for controlling registration of the two separately formed prism arrays with respect to one another.

Referring now to FIG. 9, the details of the block diagram of the control system 100 of FIG. 1 will be explained in connection therewith. An optical encoder 82 coupled to the shaft 12 of drum A provides a digital or analog electrical signal proportional to the instantaneous rotary position in time of Drum A. This serves as the master reference signal for the system to which all other rotary devices are slaved.

The encoder 82 provides a homing signal in the form of a TTL (transistor-transistor-logic) square wave output in the quadrature with a differential line driver to the Berkeley axis machine controllers 401 through 406. These are 64 bit RISC based machine control systems. They are controlled by code (programs) which is loaded from processor 410. The code is loaded into the non-volatile memory of each controller, 401–406 via a serial port and cable. Once loaded, the Berkeley Axis Machines (BAM) control the process steps providing functions such as sequencing, motor control, input/output, interrupts and error handling. Controller 401 is designated the master BAM. As such the homing signal from Drum A, 10, is input to the 0 axis position. This signal is also sent to items 402 through 406 as the master reference signal. This indicates to each unit how fast the machine is operating. The functions directly associated with each Drum, such as coating, laminating and stripping, are adjusted from the reference signal of each respective Drum, A or B. Functions which are associated with machine speed, such as unwind and rewind are coordinated from Drum A, 10.

The homing signal can be generated by a variety of types of sensors. Common types include retroreflective edge sensors, or contrast sensors. They sense a line or spot in register with each mold mounted on the Drum A or B. This homing signal will fine tune the position of Drum A or B to ensure that the web is in alignment with the Drums. The registration sensor 90, inputs directly to Drum B to ensure that Drum B in alignment with the striped reflective film that was produced on Drum A. This registration sensor can also be an edge sensor or a reflective sensor with a fast rise time. This sensor must be place din a region of constant tension to provide accurate readings. All operator interface is controlled via a touchscreen, now shown, utilizing menu operator screens to control the operation of the various machines, shown in FIG. 1.

Optionally, very small corner-cube prisms 202 may be formed at the leading and trailing edges of the mold plates on one of the work stations A or B. If the prism arrays 70A, 70B of the two sections are allowed to overlap slightly the resultant seam 200 created by a combination of large (L) and small (S) prisms (as shown in FIG. 6) will be invisible at distances greater than a few feet. By creating an overlap as shown in FIG. 6, the mold material can be applied to the mold plates with less precision and still create a seamless appearing material. By "seamless appearing" is meant retroreflective sheeting which from a distance of about 10 feet or more appears, to the human eye, to have no seams. Preferably the larger prisms should be formed over the smaller prisms at the section of overlap. This concept not only reduces the need for accurate registration but allows for stretch in the top film.

In another alternate embodiment of the invention the tooling for the mold plates is formed with small prisms S provided at the lateral edges where overlap is allowed to occur and the larger prisms L are formed in the interior (FIG. 7A).

The resultant web 210 of film 54 and prism array 70 formed in the first curing section A is shown in FIG. 7B while the overlap of the two webs 210' (one from each section) is shown in FIG. 7C. When the overlap occurs in the B stage of the process; the smaller prisms S of the second stage B will be formed on top of the smaller prisms S formed in the first stage A.

The net result at the overlap C will be smaller prisms formed on a slightly thicker layer of material that retroreflect throughout the entire overlap area. The material boundary between the two sets of small prisms will be substantially invisible to the unassisted human eye.

Note also that in FIG. 7C the thickness of the film plus prism array is maintained constant except at C. Also note that the small prisms created at the interface C will have wider observation angle performance than the larger prisms. This observation angle performance will cause the seam to be invisible at a distance close to the material while maintaining a reasonably uniform brightness at distances far from the material. The eye will not perceive a seam to be present at near or far distances. At long or far distances the eye cannot resolve the area where the overlap occurs. At short distances the eye will see uniform brightness because the small and large prisms observation angle performance will overlap.

Figure 8A:
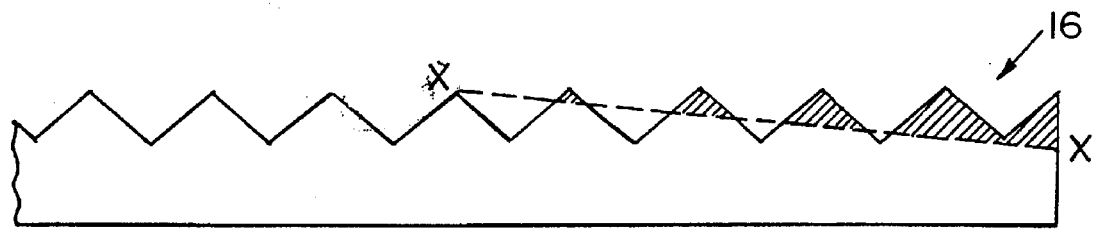
FIGS. 8A–C are a series of fragmentary side views of steps in an alternative process of making retroreflective sheeting in accordance with the invention.
Figure 8B:
Figure 8C:
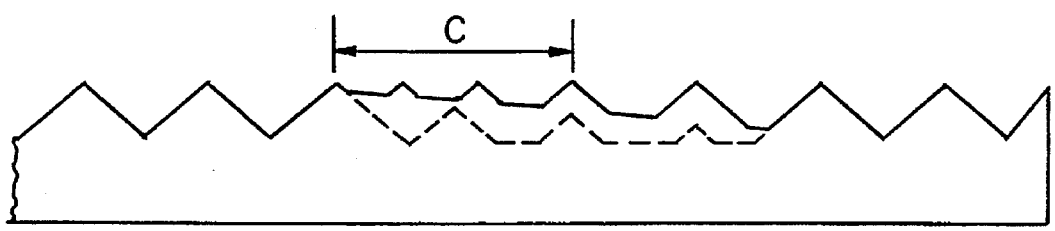

In yet a further embodiment of an overlap version of the invention; the tool or mold plate 16 is provided with a tapered prism construction at the portion which overlaps (See FIG. 8A). This can be accomplished by fly-cutting or grinding the uniform size prisms of the mold along the dotted line x—x. The resultant material formed with the tool of FIG. 8A will be shaped as shown in FIG. 8B with prisms P of decreasing height at the lateral edges. When two such tapered tools are used to form the retroreflective sheeting 300 with an overlap at C the material will appear as shown in FIG. 8C which will also appear to be seamless to the naked eye.

Although the mold plates 16 may be formed from a synthetic resin, the preferred mold plate has a metallic surface to ensure a very smooth, precise surface on the cube-corner faces and to minimize the likelihood of deterioration during extensive use, as well as of possible adhesion between the molding materials and the surface of the mold. Accordingly, the mold may be fabricated directly from a suitable metal by engraving, bobbing or otherwise forming the cube-corner recesses therein. Alternatively, a suitably engraved or otherwise formed metallic member may be used as a master mold for forming the desired mold element by the deposition of metal thereon to form a layer of sufficient thickness which is then stripped therefrom. These stripped impressions which may be made by conventional electroforming procedures are then used as the mold elements after mounting upon a suitable support surface to avoid injury thereto and the mold surface may then be developed on a suitable support member from a multiplicity of such elements. In order to minimize corrosion of the metallic surfaces of the mold plates, it has been found desirable to provide a highly inert metallic coating thereon such as may be obtained by depositing gold or a gold alloy thereon.

As illustrated, the support for the mold surface is most desirably provided by a rotatably mounted drum, since such a drum facilitates continuous application of materials and stripping of the composite product, and also provides firm support for the mold elements thereon. Other types of support members are also feasible, such as a continuous flexible belt, or a revolving disk. However, certain disadvantages such as the non-linear configuration of the product may render the latter alternative less attractive. The means of securing the mold plates to the drum may vary considerably depending upon the degrees of permanency and rigidity and the heat transfer characteristics desired; for example, they may be bonded with appropriate adhesives, or they may be affixed with suitable screws, rivets, pins or the like.

The design of the means for dispensing materials upon the moving surface and for stripping the composite film/prism array therefrom may also vary to a considerable degree from those of the illustrated embodiment, depending primarily upon the type of drum employed, and different devices appropriate for substitution will be apparent to those skilled in the art.

Flow of the molding material into the prisms recesses may be facilitated by the prior application of a solvent, plasticizer, wetting agent or other flow promoting agent (herein collectively referred to "wetting agent"). This enhances the fluidity of the molding material about the surfaces of the recesses and greatly promotes optimum fillage thereof.

The technique utilized for achieving solidification of the molding material will vary with the particular molding material selected. When a molten synthetic resin is employed as the fluid molding material, solidification may be accomplished merely by cooling thereof; this may be accomplished through chilling of the mold, by directing cool air against the surface of the body member or by allowing the heat energy to radiate therefrom. When the molding material is a B-stage or partially polymerized resin, solidification may be accomplished by the application of heat for a period of time sufficient to achieve the desired degree of polymerization. When the molding material is a cross linkable formulation, solidification may be accomplished by promoting cross linking of the component materials through any convenient means depending upon the nature of cross linkable material. As is well known in the art, cross linking may be effected by use of free radical initiators, heat, high energy radiation and the link, and the radiating elements depicted in the drawings may therefore comprise any suitable source of energy. Thus, they may be a simple infra-red or other heat source, a source of alpha or beta particles, gamma or X-ray radiation, photons, etc. Moreover, it will be appreciated that the molding material may be essentially monomeric in character and that the solidification thereof may be accomplished by polymerization in situ within the cube-corner recesses of the mold surface; such polymerization may be promoted by heat, free radical initiators, or high energy radiation, and the actinic source may be internal for the support member if so desired. In still another technique, a plastisol formulation may be employed in which the resin if fluxed by the plasticizer upon the application of heat. Obviously, combinations of these techniques also may be used to obtain the desired solidification.

Various synthetic resins may be employed for the cube-corner formulations and for the sheet material including polymers of (alk) acrylic acid esters such as polymethyl methacrylate and polybutyl acrylate; cellulose esters such as cellulose acetate polymer, cellulose acetate/butyrate copolymer, and cellulose propionate polymer; vinyl halides such as polyvinyl fluoride; vinylidene halides such as polyvinylidene chloride; monovinylidene aromatic hydrocarbon polymers such as polystyrene and styrene/acrylonitrile copolymers; ethylenically unsaturated nitriles such as polyacrylonitrile; polycarbonates; polyesters such as polyethylene terephthalate; polyphenylene oxide; polysulfones; and polyolefins such as polyethylene and polypropylene. Interpolymers of various of the several above-mentioned types of monomers, e.g., vinyl chloride/vinyl acetate copolymers, may also be employed, as may be mixtures of polymers. The particular resin formulations selected for the components of the composite structure will vary depending upon the application, the thickness desired for the body member, the desire for flexibility, and the need for achieving interadhesion therebetween. For outdoor applications, materials which are moisture resistant, ultraviolet resistant and abrasion resistant are particularly advantageously employed at least for the body portion since that portion is generally exposed to the atmosphere and requires good weathering characteristics. Moreover, it will be appreciated that the sheet material may itself be a laminate of films or sheets of two different synthetic resins, and it may be provided with coatings of appropriate materials.

The resins preferably employed for the body portion include polyvinyl halide, polyethylene terephthalate, polyvinylidene chloride, polycarbonates, polysulfones and cellulose ester polymers. The resins preferably employed for the cube-corner formations comprise (alk) acrylic acid ester resins, acrylic-modified vinyl chloride resins, vinyl chloride/vinyl acetate copolymers, ethylenically unsaturated nitrile resins, monovinylidene aromatic hydrocarbon resins, olefin resins, cellulose ester resins, polysulfone resins, polyphenylene oxide resins and polycarbonates. Exemplary combinations for the body portion/cube-corner formations include polyvinyl chloride/acrylic modified polyvinyl chloride; polyvinyl fluoride/polyvinyl chloride; polycarbonate/polycarbonate; polyvinyl chloride/polymethyl methacrylate; polysulfone/polymethyl methacrylate; polysulfone/polyvinyl chloride; and polyethylene terephthalate/polymethyl methacrylate.

In selecting the molding materials employed for the present invention, it should be remembered that long lasting properties will require resins which do not have readily volatilizable plasticizers or other components, and which have an acceptable level of light stability. Thus, stabilized formulations are desirably employed when the resin itself is susceptible to light or oxygen degradation. By proper selection of the resin systems, the sheet material amy also provide a valuable degree of protection for the resin of the cube-corner formations, which may exhibit relatively poor stability when the cube-corner formation are selectively coated and further coated with a lacquer and/or adhesive. These coatings also may act as protective layers since the body portions will, in many applications, serve as a barrier layer for ultraviolet radiation, vapor, gasses, etc. Moreover, the sheet materials is desirably fabricated of a resin which affords a high degree of abrasion resistance since aberrations in the front surface of the composite structure will greatly reduce its retroreflectivity.

It will be readily appreciated that the cube-corner formations must have smooth faces and that the intersecting faces thereof should provide essentially perfect cube-corners. Any deviation from a perfect cube-corner or surface irregularity will materially reduce the retroreflectivity of the formation, and is desirable only under certain controlled circumstances.

Normally, the air interface at the cube-corner formations will be relied upon for retroreflection of the light rays. Obviously, the angle at which the light rays strike the faces of the cube-corners will determine whether each ray is retroreflected or passes outwardly through the rear surface. If the angle of incidence is less than the critical angle for the prism material employed, the light ray will not be retroreflected. However, the predominant portion of light rays entering the front surface of the sheet material will be retroreflected by the cube-corner formations.

The reflectivity of the cube-corner formations can be enhanced by depositing a reflective coating thereon. Such a coating may be conveniently provided by a metallizing technique such as that wherein a very thin film of aluminum or other metal is deposited on the surface by vaporization thereof at a very low subatmospheric pressure; chemical deposition techniques may also be used. Reflective coatings may also be provided by use of a lacquer containing metallic particles of pigments affording high degrees of reflectivity; for example, pearl lacquers may be employed. In still another technique, the reflective coating may be provided by a metallized synthetic plastic film applied in intimate contact over the surface of the cube-corner formations.

Although the cube-corner formations in the illustrated embodiment have a uniform orientation within the array, it is possible to employ a pattern in which certain of the cube-corner formations are disposed in such a manner that their faces are not parallel to any of the faces of the adjacent cube-corner formations. Moreover, certain of the cube-corner formations may be disposed with their apices aligned other than vertically over the center of their respective bases. By thus tipping some of the cube-corner formations, retroreflectivity over a broader angle is provided for certain applications, while maximum reflectivity is diminished. This is desirable for certain applications; for example, highway signs desirably may exhibit retroreflection over a broader angle relative to the surface of the sign and some light scattering desirably may be provided although the light rays falling thereon may be essentially perpendicular to its face.

By use of a sheet material of a relatively flexible resin, the composite structure may be readily shaped to various support surfaces, such as the corners of buildings, the contour of hand rails, etc. Moreover, since the composite structure may be very thin, seamless appearing, and highly flexible, it may be readily applied to fabrics used as garments, or it may itself be used in such a manner, thus affording a great deal of night-time visibility to the wearer. Exemplary uses for safety applications are tabs and stripes on jackets and rainwear, tags that may be worn at various points upon the body, reflective patches for hats, reflective welting for the production of various garments, etc.

Equivalents

Those skilled in the art will recognize, or be able to ascertain using no more than routine experimentation, many equivalents to specific embodiments of the invention described specifically herein. Such equivalents are intended to be encompassed in the scope of the following claims.

We claim:

1. Apparatus for forming retroreflective sheeting formed of a film upon which a seamless array of prisms is joined, said apparatus comprising at least two mold surfaces, each surface containing areas of arrays of prismatic recesses and areas of blank spaces, said apparatus including:

a first applicator for applying a prism forming material to a first such mold surface to fill the recesses with said material;

a first mechanism for transferring the material to the film to form areas of arrays of prisms on said film leaving areas of blank spaces on said film;

a second applicator for applying said prism forming material to a second such mold surface to fill the recesses in the second mold surface with said material; and a second mechanism for transferring the material in the recesses of the second mold surface onto the areas of blank spaces in the film in such a manner as to form a seamless continuous film of retroreflective sheeting.

2. The apparatus of claim 1 wherein the mold surfaces are provided on the periphery of rotatable drums and the film is transported over the drums.

3. The apparatus of claim 1 wherein the prismatic recesses in the first mold surface differ in size from those in the second mold surface and the area of the arrays of prisms in the first mold surface is larger than the area of the arrays of prisms in the second mold surface such that an overlap occurs therebetween.

4. The apparatus of claim 1 wherein the areas of the spaces and areas of arrays on said mold surfaces are substantially equal and are alternately spaced over each of the mold surfaces.

5. The apparatus of claim 1 wherein sections of the arrays of prismatic recesses adjacent the edges thereof are tapered in height.

* * * * *